UNITED STATES PATENT OFFICE.

HAL TRUEMAN BEANS, OF NEW YORK, N. Y.

TREATMENT OF PLASTER OF PARIS.

1,076,863.         Specification of Letters Patent.         Patented Oct. 28, 1913.

No Drawing.         Application filed March 17, 1911. Serial No. 615,085.

*To all whom it may concern:*

Be it known that I, HAL TRUEMAN BEANS, a citizen of the United States, and a resident of the city of New York, in the county of New York and State of New York, United States of America, have invented certain new and useful Improvements in the Treatment of Plaster of Paris, of which the following is a specification.

My invention relates to a process or method of treating plaster of Paris whereby its hardness is increased, it is rendered water-proof, and is made susceptible to high polish. Such qualities imparted to blocks for forms of plaster of Paris render it peculiarly suitable for the replacement of stone in its uses.

I will describe my invention in the following specification and point out the novel features thereof in the appended claims.

Broadly, my invention resides in producing on the plaster of Paris a surface of tungstate of calcium formed by combination of the calcium of the plaster of Paris with such soluble tungstates as are essential to the combination.

In carrying out my process I prefer to employ a saturated solution of sodium tungstate which has been rendered strongly alkaline, as, for example, by means of ammonia. This solution is applied to the surface of the hardened or "set" plaster of Paris and the surface rubbed with a cloth or other suitable material, or otherwise burnished until dry. A second application of the sodium tungstate solution is then made and the process repeated until the desired coating or surface has been produced.

The concentration of the sodium tungstate solution may be varied if desired. The particular form of sodium tungstate solution hereinbefore set forth seems best adapted to the formation of the coating of calcium tungstate which is produced during the process by chemical reaction with the calcium sulfate of the hardened plaster of Paris, and for that reason I have specifically mentioned it as a preferred chemical solution in the exemplification or disclosure of my invention herein described, although other forms of solutions or chemical equivalents which perform the same or a similar function are well within the scope of my invention.

I have stated that the compound formed by my process is a tungstate of calcium. Broadly, however, my invention includes the idea of producing a chemical change in calcium sulfate by applying thereto substances which produce a chemical reaction therein to form a tungstate or analogous compound. For example, as indicating the lines of substitution of different components in the practice of my process, it is to be noted that chemically molybdenum is much like tungstate in many of the compounds it produces. I have found it feasible to use sodium molybdate in place of sodium tungstate. The calcium molybdate is in every way analogous to the calcium tungstate, and, owing to this marked chemical and physical similarity, comes within this invention. I have used, with similar results, ammonium tungstate, potassium tungstate, sodium molybdate, potassium molybdate, and ammonium molybdate.

The other essential component for the production of the compound of my process is calcium sulfate, and by the term of plaster of Paris used herein I mean to include all those forms of calcium sulfate which have been produced by first dehydrating crystallized calcium sulfate or gypsum and then allowing the same to "set" either with water alone or with water in combination with the various hardening agents used for this purpose.

What I claim is:—

1. The process which comprises the conversion of the surface of crystallized calcium sulfate into calcium tungstate by the combination therewith of a soluble tungstate in solution.

2. The process which comprises the production of a hard water-proof surface of calcium tungstate or its substantial equivalent on hardened plaster of Paris by the chemical interaction thereof with a solution of sodium tungstate or its substantial equivalent.

3. The process of treating plaster of Paris that consists in setting the plaster of Paris into a solid mass of desired shape, making repeated applications to the surface thereof, of a solution of an alkaline tungstate adapted to combine directly with the calcium sulfate to produce a coating or surface of calcium tungstate, and burnishing the coating or surface between each application to dry and polish the calcium tungstate.

In testimony whereof I have signed my name to this specification in the presence of two subscribing witnesses.

HAL TRUEMAN BEANS.

Witnesses:
CHARLES F. CLAAR,
FRANK C. ERB.